United States Patent [19]

Hildebrandt

[11] 4,104,364

[45] Aug. 1, 1978

[54] METHOD FOR HYDROLYZING PHOSGENE

[75] Inventor: Herman F. Hildebrandt, Bel Air, Md.

[73] Assignee: The United States of America as represented by the Secretary of the Army, Washington, D.C.

[21] Appl. No.: 812,546

[22] Filed: Jul. 5, 1977

[51] Int. Cl.$^2$ ............................................. C01B 7/08
[52] U.S. Cl. .................................... 423/481; 423/437
[58] Field of Search ............................... 423/481, 437

[56] References Cited

U.S. PATENT DOCUMENTS 2,832,670  4/1958  Wollthan ............................. 423/481
3,314,753  4/1967  Richert et al. ...................... 423/481

Primary Examiner—O. R. Vertiz
Assistant Examiner—Thomas W. Roy
Attorney, Agent, or Firm—Nathan Edelberg; Kenneth P. Van Wyck

[57] ABSTRACT

A method of direct water hydrolysis of phosgene consisting essentially of the step of intimately contacting phosgene with water through means of a porous material submerged in the water through which gaseous phosgene is passed to produce a commercially useful concentration of hydrochloric acid and gaseous carbon dioxide.

5 Claims, 1 Drawing Figure

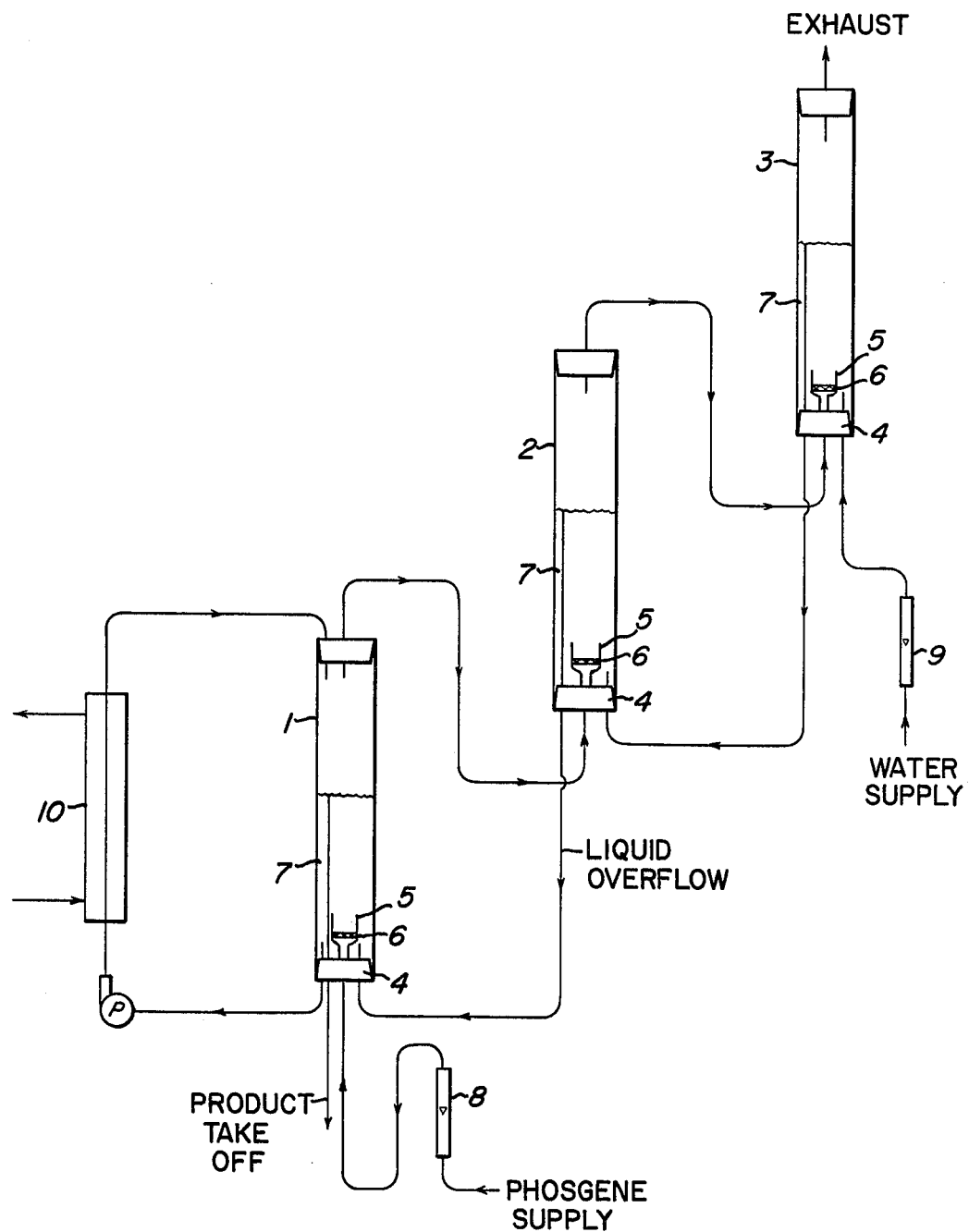

METHOD FOR HYDROLYZING PHOSGENE

DEDICATORY CLAUSE

The invention described herein may be manufactured, used, and licensed by or for the Government for governmental purposes without the payment to me of any royalty thereon.

DESCRIPTION OF THE INVENTION

This invention relates to a simple and efficient method of directly water hydrolyzing phosgene through the step of passing phosgene through a porous material submerged in the water to achieve intimate contact.

The invention further relates to a method and apparatus for disposal of large quantities of phosgene by direct water hydrolysis to a commercially useful hydrochloric acid product and carbon dioxide gas, which can be safely released to the atmosphere.

The need for detoxification and disposal of large quantities of phosgene agent has resulted in the development of a number of prior art methods of hydrolyzing phosgene. The prior methods discussed below have been successful to a limited degree in hydrolyzing phosgene, but have been costly, inefficient and have only created a newer environmental disposal problem. Among the prior art methods, it has been proposed to hydrolyze phosgene with aqueous sodium hydroxide which results in the generation of a dilute solution of sodium carbonate and sodium chloride at the rate of 2.2 pounds mixed salt per pound of phosgene hydrolysized, thereby creating an increased disposal problem. Acid hydrolysis of phosgene in a 40% to 50% acetic acid solution has also been proposed, but this method produces an undesirable mixture of hydrochloric and acetic acid which is of no real commercial value and is difficult to dispose of in the environment.

Water hydrolysis of phosgene has been proposed in the process disclosed in U.S. Pat. No. 2,832,670, but this process requires the use of activated carbon and the hydrolysis can only be complete if the resulting concentration of hydrochloric acid is maintained below 10%. The process thus requires the continual replacement of activated carbon, which is prohibitively expensive, and results in a useless acid byproduct. Applicant's process on the other hand, does not require the expensive activated carbon for complete hydrolysis of the phosgene and produces a readily commercial product at a low level of energy consumption and can be continuously operated at a cost effective level.

Finally, it has been proposed to use vapor phase hydrolysis of phosgene with steam, but this process is impractical since high levels of heat and energy are required to maintain the very high reaction temperature for long reaction times in order to achieve the necessary complete hydrolysis of the toxic phosgene.

The principal difficulty in the water hydrolysis of phosgene is phosgene characteristic low solubility in water and the necessity for achieving intimate contact between the phosgene and water. The primary object of this invention is to overcome this problem of achieving the intimate contact necessary for complete straight water hydrolysis of phosgene by passing the phosgene through a porous material submerged in the water.

A further object of this invention is to detoxify and dispose of large quantities of phosgene without adverse effect upon the environmental surroundings.

A still further object of this invention is to produce a commercially useful hydrochloric acid byproduct from the disposal of large quantities of unneeded phosgene.

Other objects of my invention will be apparent from the specification as set forth below.

The drawing is a schematic view of the continuous, countercurrent flow water hydrolysis apparatus.

The preferred direct water hydrolysis apparatus for continuous countercurrent operation in this invention, as shown in the drawing, includes three pipe columns (designated 1, 2 and 3 respectively) connected in series at staggered column heights so that gravity flow of the overflow from column to column could be utilized. Inserted into a rubber stopper, 4, at the bottom of the pipe columns are pyrex glass filter funnels, 5, which contain a porous material, 6, e.g., fritted glass of average pore size 40–60 microns. Each pipe column is fitted with a standpipe, 7, to maintain the liquid level in each column by overflow of any excess liquid. The phosgene is supplied to the apparatus by means of flowmeter 8, connecting a cylinder of phosgene (not shown) to the bottom of filter funnel, 6, of column 1. Water is continuously supplied to the apparatus through flowmeter 9 to the base of column 3. The liquid in the first column is circulated through glass condenser 10 which is used as a heat exchanger to remove the heat of reaction and thus increase the rate of phosgene absorption. The product hydrochloric acid is flowed out of the system apparatus from the standpipe 7, of column 1 while resultant $CO_2$ is exhausted from the top of column 3.

In the preferred method of operation of this invention, the porous material used was fritted glass (average pore size 40–60 microns) contained in a pyrex glass filter funnel (30 mm diameter). The filter funnel is inserted into a rubber stopper at the bottom of the pipe columns. The pipe columns, which are constructed from four-foot lengths of two-inch diameter pyrex pipe, are filled with water to a depth of 18 – 24 inches. Phosgene was metered from a cylinder to the bottom of the filter funnel in the first column. The gas leaving the first columns of the apparatus was mostly the reaction product $CO_2$ and some unreacted phosgene, which was passed through the filter funnel of the succeeding columns and finally exhausted from the top of the third column as essentially pure $CO_2$. The liquid in the first column was circulated through a glass condenser used as a heat exchanger to remove the heat of reaction. The heat of reaction was removed when it was found that phosgene absorption decreases as the temperature of the reaction increased. When the operation was performed starting with one liter of water in each column, a product hydrochloric acid of 33% by weight continuously flowed out of the system from the column one standpipe. Material balance calculations showed that 92 – 97% of the chloride charged (as phosgene and starting acid) was accounted for in the product and column acid. The highest phosgene feed rate used was one gram/min sq cm (123 lb/hr sq ft).

The particular feed rate of phosgene and water used in the process of the invention is in no way limited to the above example and can be varied to produce a desired hydrochloric acid stronger than 33% by weight, with the only critical limitation upon resultant acid strength being the solubility limits. The porous material used can also be varied to dispose of large quantities of neat phosgene through use of such commercially available materials as one square foot plates of porous carbon with an average pore diameter of 60 microns.

The essential and novel feature of this process is the use of a porous material to achieve the solution and subsequent hydrolysis of phosgene in plain water.

The advantages of this process include the simplicity of the apparatus used which has no moving parts, the ease of operation, the small amount of energy required for removal of the heat of reaction and the availability and inexpensive nature of the reactant water and the porous material used as the contact surface. Further, the process allows ready disposal of large quantities of toxic phosgene and produces commercially useful hydrochloric acid and carbon dioxide exhaust gas, without burdening the environment.

The particular details of the construction and size of the elements of the apparatus are not critical and can be varied to obtain optimum operating results dependent upon the amount of phosgene to be detoxified, the desired strength of the acid to be produced and the like. The individual pipe columns, flowmeters, conduits, filter funnels, heat exchanger and standpipes are conventional in the art and can be selected from commercially available supplies. The porous material used is also commercially available and is critical only to the extent that it facilitates intimate contact between the reactant phosgene flowed therethrough and the water used for direct hydrolysis. Porous materials having an average pore size of 40 – 60 microns have been found to be effective in the instant process, but are not limiting upon the selection of porous material having utility in the hydrolysis process in this invention.

The process and apparatus of this invention can obviously be applied to other water hydrolysis reactions within the skill of those practicing in the related arts and applicant therefore desires to be limited only by the scope of the appended claims.

I claim:

1. A process for directly hydrolyzing phosgene with water as the sole reactant to produce a commercially useful hydrochloric acid product by insuring intimate contact between the phosgene and water through use of a porous material as a reactant surface consisting essentially of the steps of providing contacting means containing a porous material submerged in an aqueous medium within each of three reactor means connected in series at staggered column heights and subsequently passing the phosgene through the porous material submerged in an aqueous medium within the lowermost first reactor means to effect intimate contact between phosgene and the aqueous medium at the porous material interface to thereby achieve the solution and subsequent hydrolysis of phosgene to commercially useful hydrochloric acid and carbon dioxide gas, subsequently passing unhydrolyzed phosgene and carbon dioxide in the exhaust from said first reactor means in turn through the porous material in next higher second and third reactor means in series to effect intimate contact between phosgene and the aqueous medium which flows in a countercurrent downward cascade to the first reactor means, removing the aqueous medium from the first reactor means as a hydrochloric acid product of approximately 33% by weight, and exhausting the carbon dioxide gas, which flows upward from said lowermost first reactor means to the third reactor means, to the atmosphere.

2. The process of claim 1 further including the step of removing the heat of reaction from the reactor means to decrease the temperature of the reactants and thereby increase phosgene absorption.

3. The process of claim 1 wherein the porous material used for achieving intimate contact between the reactants is selected from the group consisting of fritted glass and porous carbon plates.

4. The process of claim 3 wherein the porous material is fritted glass of an average pore size of 40 – 60 microns.

5. The process of claim 1 wherein a series of three 2 inch diameter column reactors are each filled with 1 liter of water.

* * * * *